United States Patent
Takada et al.

[11] Patent Number: 5,955,220
[45] Date of Patent: Sep. 21, 1999

[54] LITHIUM IRON OXIDE, METHOD OF ITS SYNTHESIS, AND LITHIUM BATTERY USING THE SAME

[75] Inventors: Kazunori Takada, Osaka; Shigeo Kondo, Hirakata; Ryoji Kanno, Kobe; Tatsuya Nakamura, Hiroshima; Mikio Takano, Kyoto, all of Japan

[73] Assignees: Matsushita Electric Industrial Co., Ltd., Osaka-fu; Toda Kogyo Corporation, Hiroshimaken, both of Japan

[21] Appl. No.: 08/947,259

[22] Filed: Oct. 8, 1997

[30] Foreign Application Priority Data

Oct. 15, 1996 [JP] Japan .................................. 8-272705

[51] Int. Cl.$^6$ ........................................................... H01M 4/52
[52] U.S. Cl. ........................ 429/221; 429/231.1; 423/641
[58] Field of Search ..................... 423/594, 641, 423/632; 429/231.1, 221

[56] References Cited

U.S. PATENT DOCUMENTS

| | | | |
|---|---|---|---|
| 4,340,652 | 7/1982 | Raistrick et al. | 429/112 |
| 4,567,031 | 1/1986 | Riley | 423/593 |
| 5,531,920 | 7/1996 | Mao et al. | 252/182.1 |
| 5,789,110 | 8/1998 | Saidi et al. | 429/218 |
| 5,863,512 | 1/1999 | Ado et al. | 423/138 |

FOREIGN PATENT DOCUMENTS

| | | | |
|---|---|---|---|
| 0 728 702 A1 | 8/1996 | European Pat. Off. . | |
| 8-295518 | 11/1996 | Japan | C01G 49/00 |
| 2 087 858 | 6/1982 | United Kingdom . | |

OTHER PUBLICATIONS

Kanno et al., "Synthesis and electrochemical properties of lithium iron oxides . . . ", J. Power Sources, vol. 68, p. 145. (No month available), 1997.

Kanno et al., "Synthesis, Structure, and Electrochemical Properties of a New Lithium Iron Oxide . . . " J. Electrochem. Soc., vol. 143, No. 8, p. 2435, Aug. 1996.

Shirane et al., "Structure and physical properties of lithium iron oxide . . . ", Solid State Ionics, vol. 79, p. 227. (No month available), 1995.

Fuchs et al., "Synthesis of LiMnO2 and LiFeO2 . . . ", Solid State Ionics, vol. 68, p. 279. (No month available), 1994.

J.M. Fernandez–Rodriguez et al.; "Synthesis and alteration of –LiFeO$_2$ by mechanochemical processes"; Journal of Materials Science 23 (1988) pp. 2971–2974 No Month Available.

Takayuki Shirane et al.; "Synthesis and Electrode Characteristics of Layered LiFeO$_2$ "; Proceedings of the 36th Battery Symp. in Japan 1995; pp. 23–24 No Month Available.

Mitsuharu Tabuchi et al.; "Preparation of AFeO$_2$ (A=Li, Na) by hydrothermal method"; Solid State Ionics 79 (1995) pp. 220–226 (No Month Available).

Mitsuharu Tabuchi et al.; "Preparation of AFeO$_2$ (A=Li, Na) by Hydrothermal Method"; The 20th Commemorative International Symp. on Solid State Ionics in Japan, Extended Abstracts (1994); pp. 149–150 No Month Available.

Sakurai et al., "Low Temperature Synthesis and Cathode Properties of LiFeO2", Proc. Electrochemical Society of Japan, Spring Mtg., Japan, p. 108 (no month available), 1996.

Tawara, et al., "Secondary Nonaqueous Lithium Batteries With Improved Electrode Active Mass And Their Manufacture," Chemical Abstracts, vol. 121, No. 22 (1994), Abstract No. 259652w. No Month.

*Primary Examiner*—Maria Nuzzolillo
*Assistant Examiner*—Carol Chaney
*Attorney, Agent, or Firm*—Panitch Schwarze Jacobs & Nadel, P.C.

[57] ABSTRACT

A lithium iron oxide which can be used as an electrode active material for a lithium battery is disclosed. A lithium iron oxide represented by $Li_xFeO_2$, where $0<x<2$, having a tunnel structure similar to $\beta$-FeO(OH) can be synthesized by heating a suspension prepared by suspending $\beta$-FeO(OH) and a lithium compound in an alcohol at a temperature of not lower than 50° C., more preferably at a temperature of lower than the boiling point of the alcohol used for the suspension.

6 Claims, 5 Drawing Sheets

LITHIUM IRON OXIDE, METHOD OF ITS SYNTHESIS, AND LITHIUM BATTERY USING THE SAME

BACKGROUND OF THE INVENTION

The present invention relates to a lithium iron oxide, a method of its synthesis, and a lithium battery including such lithium iron oxide as an electrode active material.

Currently, with the development of portable equipment such as personal computers, handy phones, etc., there has been an increasing demand for a battery as a power source therefor. In particular, lithium batteries have been investigated vigorously as a battery that can ensure a high energy density. This is because lithium has a small atomic weight and can give a high ionization energy.

As the positive electrode active materials used for these lithium batteries, those that can generate a voltage of as high as 4 V, such as $Li_xCoO_2$ or $Li_xNiO_2$, have been actively studied recently, in an attempt to increase the electromotive force and energy density of batteries. However, because cobalt or nickel compounds, such as $Li_xCoO_2$ or $Li_xNiO_2$, are costly, and outputs of cobalt and nickel are relatively small, such compounds are not optimal materials for practical batteries. Therefore, compounds prepared by substituting Co or Ni in the aforementioned compounds with one of other transition metal elements, particularly iron compounds with a substitution of Co or Ni with iron which has low cost and rich outputs, have been noted to solve the aforementioned problems.

$Li_xCoO_2$ and $Li_xNiO_2$, which are superb electrode active materials with good performance, have a layered rock salt crystal structure ($\alpha$-$NaFeO_2$ structure). Other than $Li_xCoO_2$ and $Li_xNiO_2$, only $Li_xVO_2$ and $Li_xCrO_2$ are known to have the layered rock salt crystal structure. There are no known other lithium iron oxides that have an identical layered rock salt crystal structure.

More specifically, a lithium iron oxide with a disordered tetragonal rock salt crystal structure is obtained when a mixture of an iron oxide powder and a lithium compound powder is heated at about 800° C. according to the so-called high temperature synthesis. Whereas, when the mixture is heated at about 400° C. to about 500° C. according to the so-called low temperature synthesis, then a lithium iron oxide with an ordered tetragonal rock salt crystal structure is obtained. However, neither of these lithium iron oxides have proved satisfactory as the electrode active material for practical batteries.

BRIEF SUMMARY OF THE INVENTION

In view of the above, one primary object of the present invention is to solve the above-mentioned problems thereby to provide a lithium iron oxide applicable as an electrode active material for lithium batteries.

Another object of the present invention is to provide a lithium battery using such lithium iron oxide.

The present invention provides a lithium iron oxide represented by the formula $Li_xFeO_2$, where $0<x<2$, having a tunnel structure similar to akaganeite $\beta$-FeO(OH).

The present invention also provides a method of synthesizing a lithium iron oxide, which comprises the steps of suspending $\beta$-FeO(OH) and a lithium compound in an alcohol to prepare a suspension, and heating the suspension at a temperature of not lower than 50° C.

The heating temperature in the heating step is preferably lower than the boiling point of the alcohol used for the suspension.

The lithium battery of the present invention comprises a lithium ion conductive electrolyte and a pair of electrodes, at least one of the pair of electrodes having this lithium iron oxide.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
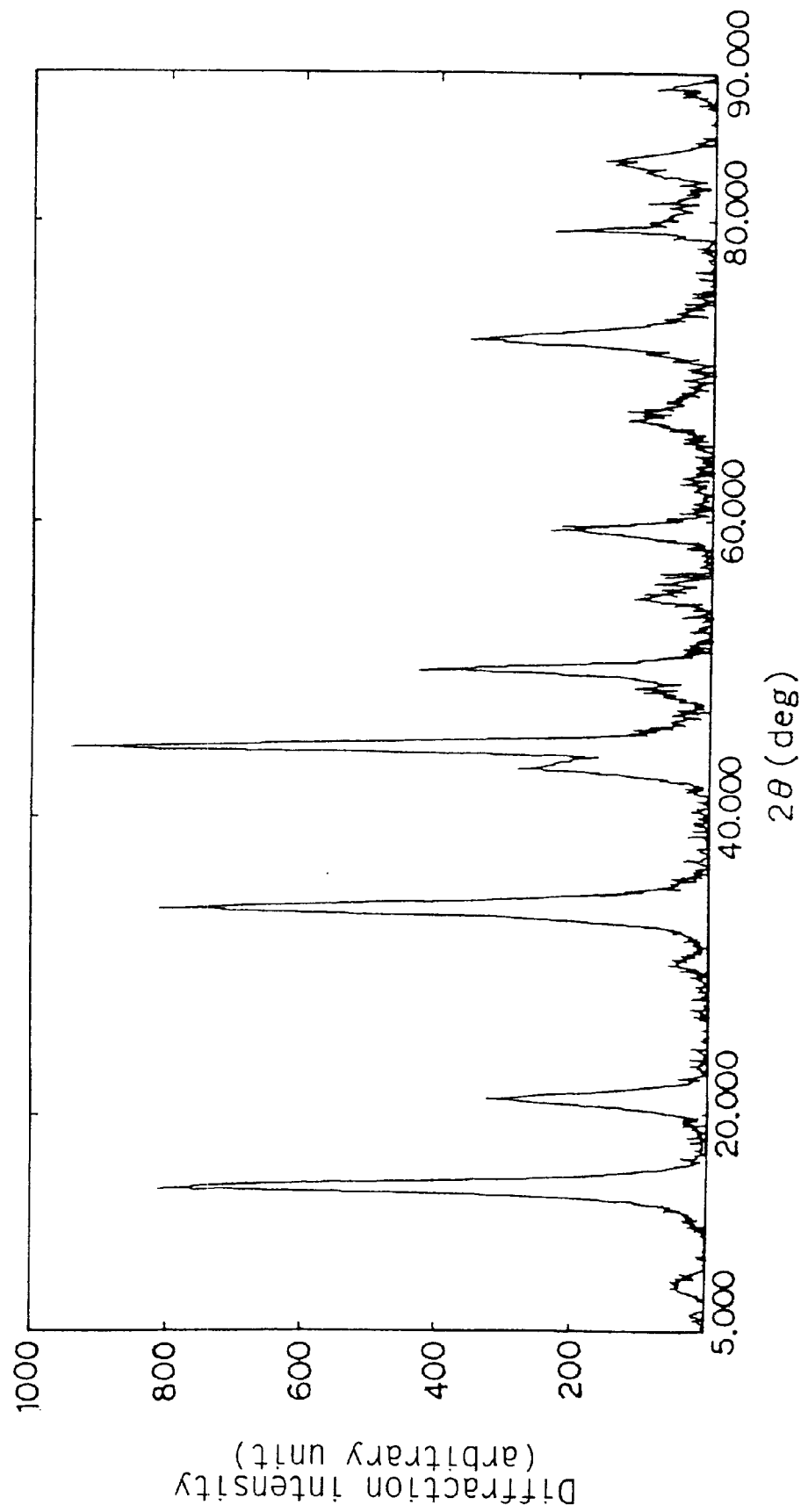
FIG. 1 illustrates an X-ray diffraction pattern of a lithium iron oxide in one example of the present invention.

Akaganeite $\beta$-FeO(OH) is an iron compound having a tunnel crystal structure and retains protons inside the tunnel of the tunnel structure. Therefore, if this iron compound is heated in the presence of a lithium compound, ion exchange reaction occurs between proton and lithium ion. As a result, proton present in the tunnel is eliminated, which in turn causes lithium ion to enter the tunnel. In this way, a lithium iron oxide $Li_xFeO_2$ with the tunnel structure, where $0<x\leq1$, can be produced.

The lithium iron oxide $Li_xFeO_2$ synthesized in this way can be used as an electrode active material for lithium batteries, because of the fact that lithium ions included in the tunnel of its tunnel structure can electrochemically move inside and outside the tunnel.

The $\beta$-FeO(OH) powder used in the present invention has a mean particle diameter of about 0.01 $\mu$m to about 1.0 $\mu$m. Such $\beta$-FeO(OH) powder can be produced by a known method. The representative method of producing powdery $\beta$-FeO(OH) involves heating an acidic suspension prepared by suspending a ferric compound in hydrochloric acid solution to cause hydrolysis.

In the present invention, any of LiOH, LiOH·$H_2O$, $Li_2O$, $Li_2O_2$, $Li_2O_3$ and the like may be used as the lithium compound.

In the present invention, any alcohol selected from among ethanol, butanol, hexanol, propanol, and the like may also be used as the alcohol. From the aspects of cost and safety, however, ethanol is preferable.

The preferable mixing ratio of the $\beta$-FeO(OH) powder to the lithium compound powder is in a range of lithium/iron (Li/Fe)>1.0 in a molar ratio. If the Li/Fe ratio is below 1.0 in a molar ratio, the starting material $\beta$-FeO(OH) remains, and the resultant lithium iron oxide fails to show high activity as an electrode in a lithium ion conductive electrolyte. Therefore, if such lithium iron oxide is used as an electrode active material, it becomes difficult to have a lithium battery with good performance.

By contrast, if the ratio of lithium compound significantly exceeds the stoichiometric composition range, unreacted lithium compound remains in the resultant lithium iron oxide, together with $Li_xFeO_2$ where $0<x\leq1$, but the remaining unreacted lithium compound can be removed by simply washing it with alcohol.

On the other hand, if ion exchange reaction is caused in the presence of water, it is difficult to have a highly active lithium iron oxide electrode. Therefore, it is preferable to cause ion exchange reaction in the presence of an alcohol.

In a preferred mode of the present invention, the heating temperature of the suspension of the mixture of two powders is not lower than 50° C., and in a range not higher than the boiling point of the alcohol used for the suspension. If the suspension is heated below 50° C., the ion exchange reaction proceeds at low rate, which prolongs the reaction time.

On the other hand, if the heating temperature exceeds the boiling point of the alcohol used for the suspension, it becomes necessary to use a special vessel, such as autoclave, in order to prevent evaporation of alcohol, which is not suitable from the industrial point of view.

The powder of the lithium iron oxide of the present invention is a product of ion exchange reaction between proton retained in the tunnel of the tunnel structure of the β-FeO(OH) and lithium ion contained in the lithium compound. The resultant compound has a composition of $Li_xFeO_2$, where $0<x\leq1$.

A composition of $Li_xFeO_2$ changes from $0<x\leq1$ to $0<x<2$ by electrochemical intercalation and deintercalation of lithium ions.

This means that although it is ideal that the ion exchange reaction between proton of β-FeO(OH) and lithium ion of a lithium hydroxide should be represented by the below-mentioned formula (1), and the resultant lithium oxide has a composition represented by $Li_xFeO_2$, where $x=1.0$, ion exchange reaction is often incomplete in actual cases, and sometimes remains at the level of reaction represented by the below-mentioned formula (2). Therefore, the resultant lithium iron oxide has a composition of $Li_xFeO_2$, where $0<x\leq1$ in general.

$$\beta\text{-FeOOH}+\text{LiOH}\rightarrow\text{LiFeO}_2+\text{H}_2\text{O} \tag{1}$$

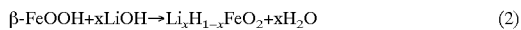

$$\beta\text{-FeOOH}+x\text{LiOH}\rightarrow\text{Li}_x\text{H}_{1-x}\text{FeO}_2+x\text{H}_2\text{O} \tag{2}$$

where, $0\leq x<1$.

On the other hand, as stated above, the lithium iron oxide of the present invention shows electrochemical intercalation and deintercalation of lithium ions, represented by the below-mentioned formula (3), in a lithium battery. This changes the composition ratio of lithium ion in the lithium iron oxide. In such lithium iron oxide, the stable formal charges for iron ions are limited to +2, +3 and +4. Therefore, the lithium iron oxide has a composition represented by $Li_xFeO_2$, where $0x<2$, when included in a lithium battery.

$$\text{Li}_x\text{FeO}_2+x'e^-+x'\text{Li}^+\rightarrow\text{Li}_{x+x'}\text{FeO}_2 \tag{3}$$

where, $0<x+x'<2$.

The powder of the lithium iron oxide of the present invention has a particle diameter almost similar to that of the iron starting material β-FeO(OH) (mean, about 0.01 to 1.0 μm).

The lithium iron oxide having the tunnel structure can cause electrochemical intercalation and deintercalation of lithium ion in any lithium ion conductive electrolyte. This enables the use of the lithium iron oxide as an electrode active material, thereby to fabricate a lithium battery having the lithium iron oxide electrode.

If such lithium iron oxide is used as the positive electrode active material, then even a substance that is lower in potential than the lithium iron oxide can be used as the negative electrode active material. Examples of such negative electrode active materials may be metallic lithium, aluminum, indium, gallium and tin, any alloys of these metals with lithium, and any intercalation compounds of graphite and lithium.

On the other hand, if the lithium iron oxide is used as the negative electrode active material, even a substance that is higher in potential than the lithium iron oxide can be used as the positive electrode active material. More specifically, any of lithium cobalt oxides, lithium nickel oxides, lithium manganese oxides, lithium nickel vanadium oxides, halogens such as iodine, and halides may be used as the positive electrode active material.

As the electrolyte included in the lithium battery, those prepared by dissolving a lithium salt, such as lithium perchlorate, lithium phosphofluoride, lithium borofluoride and the like, in an organic solvent or a mixture of two or more organic solvents selected from propylene carbonate, ethylene carbonate, dimethoxyethane, diethoxyethane, y-butyrolactone and the like, polymer solid electrolytes, such as lithium perchlorate-polyethylene oxide and the like, and inorganic solid electrolytes, such as $Li_2S$-$SiS_2$, which are all lithium ion conductive, may be used.

In the following, the present invention will be described more specifically by way of examples.

EXAMPLE 1

In the present example, a lithium iron oxide having the tunnel structure was synthesized from β-FeO(OH) as the iron compound and lithium hydroxide (LiOH) as the lithium compound, and examined for its activity as an electrode active material for lithium batteries.

Synthesis of Lithium Iron Oxide:

First, 12.0 g of β-FeO(OH) and 3.88 g of LiOH (Li/Fe ratio=1.2 in a molar ratio) were dispersed in 300 ml of ethanol, and the resultant dispersion was heated to 70° C. and reacted for 10 hours. The suspension thus obtained was filtrated to collect solid reaction products, which were then washed with ethanol, dried for one day at room temperature under reduced pressure. In this way, a yellow brown powder was obtained.

The powder was then chemically identified using an X-ray diffractometer, manufactured by Rigaku Denki Co., Ltd. (type of X-ray: Mn-filtered Fe-Kα; X-ray tube voltage: 40 kV; tube current: 20 mA). The result showed that the lithium iron oxide powder had the tunnel structure analogous to β-FeO(OH) as shown by the X-ray diffraction pattern in FIG. 1.

Apart from this, the lithium iron oxide was dissolved in concentrated hydrochloric acid, and the composition of lithium and iron was quantified by the standard-additional technique, using an inductively coupled plasma spectrotometer, ICAP-575, manufactured by Nippon Jarrell-Ash Co., Ltd. The lithium iron oxide was found to have a composition of $Li_{0.95}FeO_2$.

As shown above, it was found that the present invention can give a lithium iron oxide having the tunnel structure.

Evaluation of Electrochemical Properties:

Then, electrochemical property of the lithium iron oxide prepared above was investigated by a potential sweep technique.

First, the lithium iron oxide was mixed with polytetrafluoroethylene (hereinafter abbreviated to PTFE) as a binder and graphite as a conductive agent in a weight ratio of 8:1:1. The mixture (30 mg) was then integrated with a stainless steel mesh as a current collector, and used as a working electrode. The resultant working electrode was spot-welded with a lead terminal of a stainless steel wire.

Separately, a counter electrode was prepared by bonding a metallic lithium foil onto a stainless steel mesh with pressure, followed by spot-welding of a lead terminal of a stainless steel wire. A reference electrode was prepared in the same manner using metallic lithium.

As the lithium ion conductive electrolyte, one prepared by dissolving 1 M lithium perchlorate in a mixture solvent of propylene carbonate and dimethoxyethane in a volumetric ratio of 1:1 was used.

All of the working electrode, counter electrode and reference electrode were immersed in the electrolyte and an electrochemical cell for measurement of the electrochemical property of the electrode was produced. Using the electrochemical cell, a potential sweep was performed in a voltage range of 1.5 V to 3.5 V vs. $Li/Li^+$ at a rate of 10 mV/sec. Changes in current during the potential sweep were measured. The fabrication of electrochemical cell and the subsequent measurement were performed in a dry box filled with an argon gas.

The measurement result showed that an oxidation-reduction wave appeared in the potential-current curve, indicating electrode activity of the lithium iron oxide of the present invention in the lithium ion conductive electrolyte.

EXAMPLES 2–5

Lithium iron oxides were synthesized in the same manner as in Example 1, except that $\beta$-FeO(OH) powder and lithium compound powder were mixed at various Li/Fe ratios, and the mixtures were suspended in different alcohols and heated at different temperatures as shown in Table 1.

TABLE 1

| | Li/Fe | Alcohol | Heating temperature (°C.) | Composition | Current value (mA) |
|---|---|---|---|---|---|
| Example 1 | 1.2 | ethanol | 70 | $Li_{0.85}FeO_2$ | 12.3 |
| Example 2 | 1.4 | ethanol | 70 | $Li_{0.87}FeO_2$ | 14.1 |
| Example 3 | 1.0 | ethanol | 70 | $Li_{0.72}FeO_2$ | 10.9 |
| Example 4 | 1.2 | butanol | 110 | $Li_{0.83}FeO_2$ | 11.8 |
| Example 5 | 1.4 | hexanol | 140 | $Li_{0.90}FeO_2$ | 13.5 |

Comparative Example 1

A lithium iron oxide powder was synthesized under the same conditions as applied in Example 1, except for the use of an Li/Fe ratio of 0.8 and a heating temperature of 70° C.

Comparative Example 2

Another lithium iron oxide powder was synthesized under the same conditions as applied in Example 1, except for the use of an Li/Fe ratio of 1.4 and a heating temperature of 45° C.

The lithium iron oxide powders of Examples 2 to 5 in accordance with the present invention and those of Comparative Examples 1 and 2 were all found to have the tunnel structure.

Then, electrochemical properties of these lithium iron oxide powders were evaluated in the same manner as in Example 1. Table 1 also lists the conditions of synthesis and the reduction current value during polarization at 1.5 V as an index of electrode activity in these lithium iron oxide powders, in addition to those of Example 1.

In the yellow brown lithium iron oxide powders obtained in Comparative Examples 1 and 2, reduction current values were measured during polarization at 1.5 V. The two powders showed a current value of 7.0 mA and 4.8 mA, respectively, which were smaller than those of the lithium iron oxide powders of Examples 1 to 5 in accordance with the present invention.

As shown above, it was found that the present invention can give lithium iron oxides that show higher electrochemical activities.

Comparative Example 3

$\beta$-FeO(OH) and LiOH were dispersed in water in place of ethanol used in Example 1, and the resultant dispersion was heated to 70° C. and reacted for 10 hours. The suspension thus obtained was filtrated to collect solid reaction products, which were then washed with water and dried at room temperature for one day under reduced pressure. In this way, a yellow brown powder was obtained.

Then, electrochemical property of the yellow brown powder was tested in the same manner as in Example 1. The result showed that the reduction current value at polarization of 1.5 V was 1.6 mA. This indicated that ion exchange reaction in the presence of water does not yield a lithium iron oxide that shows high electrode activity.

EXAMPLE 6

In the present example, a lithium battery was produced by using a lithium iron oxide having the tunnel structure as the positive electrode active material.

As the lithium iron oxide having the tunnel structure, one synthesized in Example 1 was used here. The lithium iron oxide, PTFE as a binder, and carbon as a conductive agent were mixed in a weight ratio of 8:1:1. The resultant mixture was integrated with a titanium mesh as a current collector, punched into a disc of 14 mm diameter, and used as the positive electrode.

A metallic lithium foil punched into a disc of 14 mm diameter was used as the negative electrode.

As the lithium ion conductive electrolyte, one prepared by dissolving 1 M lithium perchlorate in a mixture solvent of propylene carbonate and dimethoxyethane in a volumetric ratio of 1:1 was used.

Figure 2:
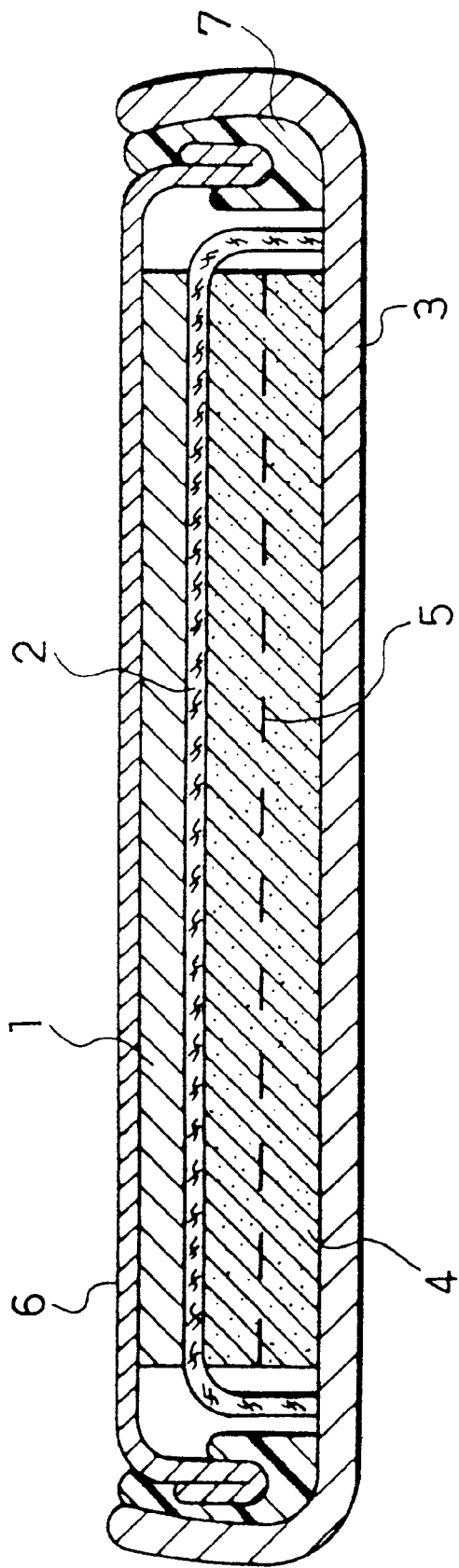
FIG. 2 shows a longitudinal cross-sectional view of a lithium battery in one example of the present invention.

A lithium battery as shown in FIG. 2 was assembled using the positive electrode, negative electrode and electrolyte, by interposing a separator of a micro porous polypropylene film having a thickness of 50 μm therebetween.

In FIG. 2, a negative electrode designated by numeral 1 is tightly pressed onto an inner surface of a stainless steel sealing plate 6. A positive electrode 4 having a current collector 5 is placed in the central part of a battery case 3 of a stainless steel and covered with a separator 2. After the electrolyte is injected into the separator, the sealing plate 6 attached with a gasket 7 is joined to the battery case 3. Then, an end of the battery case 3 was crimped to seal the battery. In this way, a sealed battery is assembled.

Figure 3:
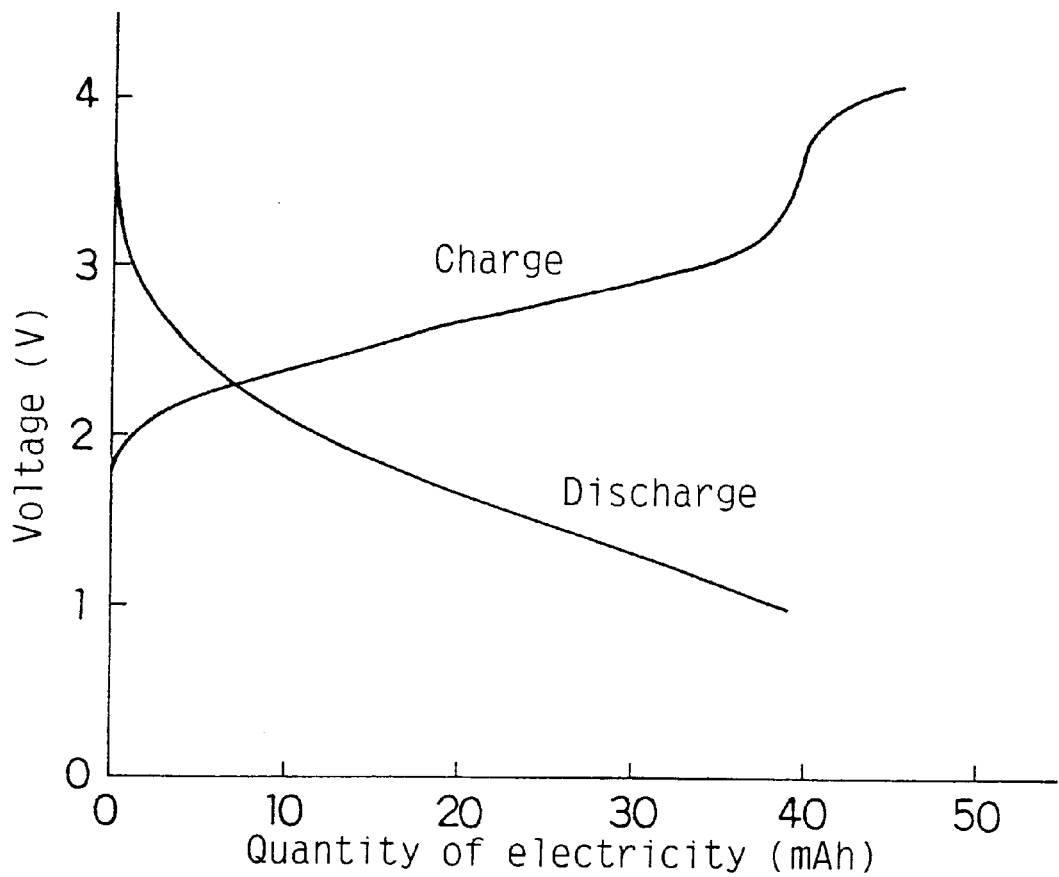
FIG. 3 illustrates a charge-discharge curve of the lithium battery in the same example of the present invention.

The lithium battery thus produced was subjected to a charge/discharge cycle test at a constant current of 1 mA in a voltage range of 1.0 V to 4.1 V. FIG. 3 illustrates a charge/discharge curve of the lithium battery. As clearly seen from FIG. 3, the lithium battery can operate in a voltage range of 3 V to 1 V, indicating that the lithium battery is rechargeable.

From the above, it was found that the present invention can give a lithium battery which can use an iron compound as the electrode active material.

EXAMPLE 7

In the present example, lithium batteries were produced in the same manner as in Example 6, except that the lithium iron oxides synthesized in Examples 2 to 5 were used in place of the lithium iron oxide synthesized in Example 1, and their electrochemical properties were evaluated.

The results showed that the charge/discharge curves of these lithium batteries were substantially the same as that of Example 6. This indicated that the present invention can give lithium batteries that can include an iron compound as the electrode active material.

EXAMPLE 8

In the present example, a lithium battery was produced using the lithium iron oxide having the tunnel structure synthesized in Example 1 as the negative electrode active material.

First, the lithium iron oxide synthesized in Example 1, PTFE as a binder, and carbon as a conductive agent were mixed in a weight ratio of 8:1:1. The resultant mixture (200 mg) was integrated with a stainless steel mesh as a current collector, punched into a disc of 14 mm diameter, and used as the negative electrode.

As the positive electrode active material, $LiCoO_2$ synthesized in the below-mentioned manner was used.

$Li_2CO_3$ and $Co_3O_4$ used as the starting materials were mixed in a molar ratio of 3:2. The resultant mixture was placed in an alumina crucible and heated at 750° C. for 24 hours in an oxygen stream. In this way, $LiCoO_2$ was obtained.

$LiCoO_2$ thus synthesized was mixed with PTFE as a binder and carbon as a conductive agent in a weight ratio of 8:1:1. The resultant mixture (500 mg) was integrated with a stainless steel mesh as a current collector, punched into a disc of 14 mm diameter, and used as the positive electrode.

A lithium battery was produced in the same manner as in Example 6, except for the use of the positive and negative electrodes thus obtained.

Figure 4:
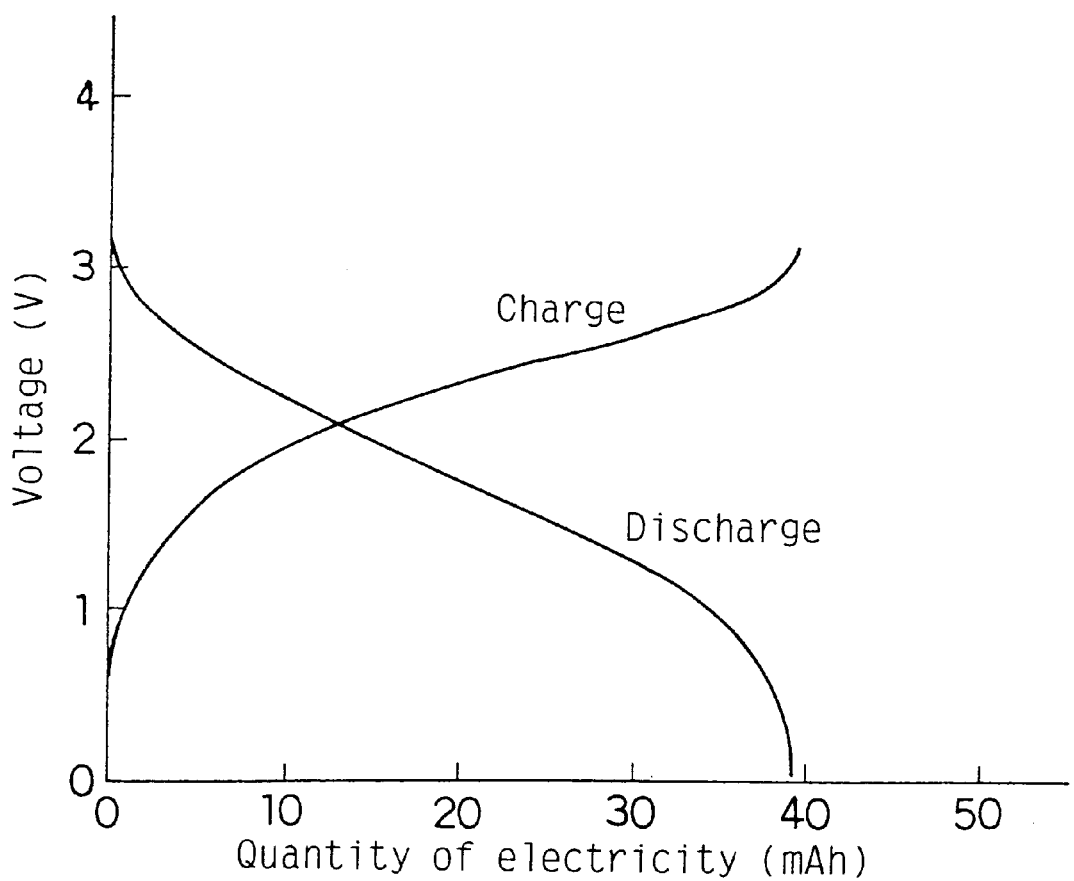
FIG. 4 illustrates a charge-discharge curve of a lithium battery in another example of the present invention.

The lithium battery was subjected to a charge/discharge test at a constant current of 1 mA in a voltage range of 0 V to 3.1 V. FIG. 4 shows a charge/discharge curve of the lithium battery. As clearly seen from the figure, the lithium battery can operate in a voltage range of 1 V to 3 V, indicating that the battery is rechargeable.

As shown above, the present invention can give a lithium battery that can use an iron oxide as the electrode active material.

EXAMPLE 9

In the present example, a solid lithium battery was fabricated by using the lithium iron oxide having the tunnel structure synthesized in Example 1 and a lithium ion conductive glassy sulfide-based solid electrolyte represented by $0.6Li_2S$-$0.4SiS_2$, and its property was evaluated.

The $0.6Li_2S$-$0.4SiS_2$ solid electrolyte was synthesized in the below-mentioned manner.

A lithium sulfide ($Li_2S$) and a silicon sulfide ($SiS_2$) were mixed in a molar ratio of 3:2. The resultant mixture was put into a glassy carbon crucible, which was then placed in a vertical furnace and heated to 950° C. in an argon stream to melt the mixture. After heated for 2 hours, the crucible was dropped into liquid nitrogen and the melt was quenched. In this way, a lithium ion conductive glassy solid electrolyte represented by $0.6Li_2S$-$0.4SiS_2$ was obtained.

The solid electrolyte thus synthesized was pulverized and mixed with the lithium iron oxide synthesized in Example 1 in a weight ratio of 1:1. The resultant mixture was further mixed with carbon as a conductive agent in a weight ratio of 9:1, and used as the positive-electrode material.

As the negative electrode, an indium-lithium alloy prepared by pressing a metallic lithium foil onto 0.1-mm-thick metallic indium punched into a disc of 10 mm diameter was used.

The positive electrode material (200 mg) and the negative electrode of an indium-lithium alloy foil thus prepared were pressed together to a disc of 10 mm diameter with the solid electrolyte interposed therebetween, and used as a solid lithium battery element. The element was housed in a stainless steel battery case, and sealed by a sealing plate provided with a gasket. In this way, a solid lithium battery was assembled.

Figure 5:
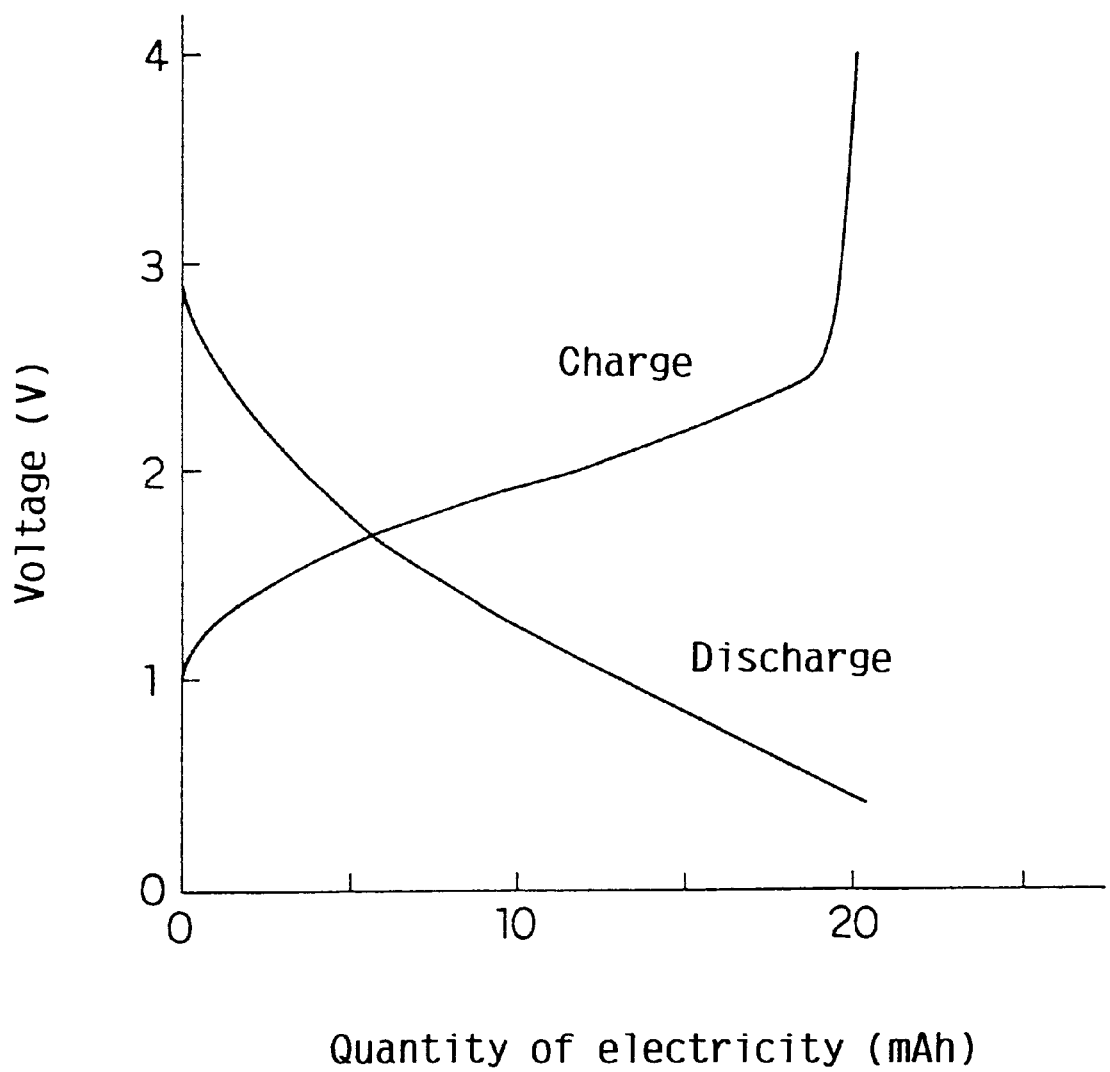
FIG. 5 illustrates a charge-discharge curve of a lithium battery in still another example of the present invention.

The solid lithium battery thus prepared was subjected to a charge/discharge test at a constant current of 100 $\mu A$ in a voltage range of 0.4 V to 4.0 V. FIG. 5 shows a charge/discharge curve of the battery. As is clearly seen from FIG. 5, the solid lithium battery can be operated in a voltage range of 3 V to 0.4 V, indicating that the battery is rechargeable.

From the above, it was found that the present invention can give a solid lithium battery that includes a lithium iron oxide as the electrode active material.

In the foregoing examples, when the lithium iron oxide was used as the positive electrode active material, metallic lithium or an indium-lithium alloy was used as the negative electrode active material. However, in the present invention, other lithium alloys, such as Li—Al, or graphite can also be used as the negative electrode active material in order to achieve similar effects, and the present invention is not limited to only the lithium batteries that use the negative electrode active materials disclosed in the foregoing examples.

In the foregoing examples, when the lithium iron oxide was used as the negative electrode active material, $LiCoO_2$ was used as the positive electrode active material. However, any of $LiNiO_2$ and $LiMn_2O_4$ may also be used as the positive electrode active material to produce a lithium battery. Thus, the present invention is not limited to only the lithium batteries that use the positive electrode active materials disclosed in the foregoing examples.

In the foregoing examples, an electrolyte prepared by dissolving lithium perchlorate in a mixture solvent of propylene carbonate and dimethoxyethane or a sulfide lithium ion conductive glassy solid electrolyte represented by $0.6Li_2S$-$0.4Si_2S$ was disclosed as the electrolyte of the lithium battery of the present invention. However, electrolytes containing $LiPF_6$ as a solute, those containing ethylene carbonate as a solvent, and solid electrolytes represented by $Li_3PO_4$-$Li_2S$-$SiS_2$, $LiI$-$Li_2S$-$B_2S_3$, $Li_2S$-$P_2S_5$, $LiI$-$Al_2O_3$ and the like can also be used as the electrolyte, in addition to those exemplified in the foregoing examples. Thus, the present invention is not limited to only the lithium batteries that use the electrolytes exemplified in the foregoing examples.

In the foregoing examples, LiOH was used as the starting material lithium compound, but similar effects can be obtained even when $LiOH \cdot H_2O$, LiOH, $Li_2O$, $Li_2O_2$, $Li_2O_3$ and the like or mixtures of these, which have not been shown in the foregoing examples, may also be used as the starting materials. Thus, in the present invention, the starting materials are not limited to those lithium compounds exemplified in the foregoing examples.

As discussed above, according to the present invention, it is possible to have a lithium iron oxide which shows electrode activity in a lithium ion conductive electrolyte, thereby functioning as an electrode active material for lithium batteries.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A lithium iron oxide represented by $Li_xFeO_2$, where 0<x<2, having a tunnel structure similar to $\beta$-FeO(OH).

2. A method of synthesizing the lithium iron oxide in accordance with claim 1, said method comprising the steps of:

suspending $\beta$-FeO(OH) and a lithium compound in an alcohol, and heating said suspension at a temperature of not lower than 50° C.

3. The method of synthesizing a lithium iron oxide in accordance with claim 2, wherein the heating temperature in said heating step is lower than the boiling point of said alcohol.

4. The method of synthesizing a lithium iron oxide in accordance with claim 2, wherein said lithium compound is at least one selected from the group consisting of LiOH, $LiOH \cdot H_2O$, $Li_2O$, $Li_2O_2$ and $Li_2O_3$.

5. A method of synthesizing a lithium iron oxide represented by $Li_xFeO_2$, where 0<x<2, having a tunnel structure similar to $\beta$-FeO(OH), said method comprising the steps of:

suspending $\beta$-FeO(OH) and a lithium compound in an alcohol, and heating said suspension at a temperature of not lower than 50° C.

6. A lithium battery comprising a lithium ion conductive electrolyte and a pair of electrodes, at least one of said pair of electrodes having the lithium iron oxide in accordance with claim 1.

* * * * *